US012478163B2

(12) United States Patent
Donohue

(10) Patent No.: US 12,478,163 B2
(45) Date of Patent: Nov. 25, 2025

(54) MAKEUP MACHINE WITH A COMPACT HOUSING

(71) Applicant: GloryMakeup Inc., Taipei (TW)

(72) Inventor: Daniel Ariel Donohue, Miami, FL (US)

(73) Assignee: GloryMakeup Inc., Taipei (TW)

( * ) Notice: Subject to any disclaimer, the term of this patent is extended or adjusted under 35 U.S.C. 154(b) by 702 days.

(21) Appl. No.: 17/858,035

(22) Filed: Jul. 5, 2022

(65) Prior Publication Data

US 2023/0042296 A1 Feb. 9, 2023

Related U.S. Application Data

(60) Provisional application No. 63/239,908, filed on Sep. 1, 2021, provisional application No. 63/229,489, filed on Aug. 4, 2021.

(51) Int. Cl.
*A45D 34/04* (2006.01)
*A45D 34/00* (2006.01)
*B05B 13/04* (2006.01)

(52) U.S. Cl.
CPC .......... *A45D 34/04* (2013.01); *B05B 13/0421* (2013.01); *B05B 13/0431* (2013.01); *A45D 2034/007* (2013.01); *A45D 2200/057* (2013.01)

(58) Field of Classification Search
CPC .............. A45D 34/04; A45D 2034/007; A45D 2200/057; A45D 2200/25; A45D 44/005; A45D 40/00; A45D 33/02; B05B 13/0421
See application file for complete search history.

(56) References Cited

U.S. PATENT DOCUMENTS 1,650,241 A * 11/1927 Stenholm ............... A45C 5/005 132/288
4,128,317 A * 12/1978 LeCover .................. A61B 3/00 297/391
8,464,732 B2 6/2013 Wong
2012/0067364 A1* 3/2012 Wong .................. A45D 44/005 132/200
2018/0236474 A1 8/2018 Wang
2019/0053608 A1 2/2019 Staton et al.
2020/0285835 A1* 9/2020 Whitelaw ............ A45D 44/005

OTHER PUBLICATIONS

International Search Report, PCT/CN2022/107997 mailed Oct. 26, 2022.

* cited by examiner

*Primary Examiner* — Dah-Wei D. Yuan
*Assistant Examiner* — Stephen A Kitt
(74) *Attorney, Agent, or Firm* — Tong J. Lee

(57) ABSTRACT

A makeup machine includes a housing, a rotating platform, a spray head, moving means, and a controller circuit. The rotating platform rotates in the housing around a vertical center axis. The spray head is coupled to the rotating platform. The spray head is operative to receive a spray cartridge, and cause the spray cartridge to spray a material contained therein on a target area of a user's skin. The moving means moves the spray head vertically and horizontally relative to the target area. The moving means is coupled to the rotating platform and rotates with the rotating platform. The controller circuit within the housing controls movements of the rotating platform and the moving means.

20 Claims, 16 Drawing Sheets

Z-Axis Movement (Up)

Z-Axis Movement (Down)

Y-Axis Movement (Distal)

Y-Axis Movement (Proximal)

X-Axis Movement (Left)

X-Axis Movement (Right)

FIG. 6B
Inner Cylinder Rotation
(Clockwise)
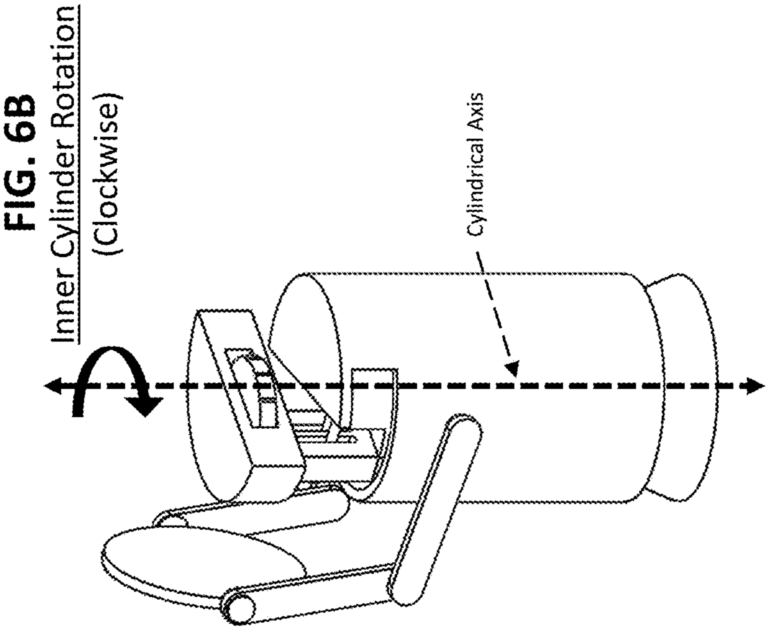
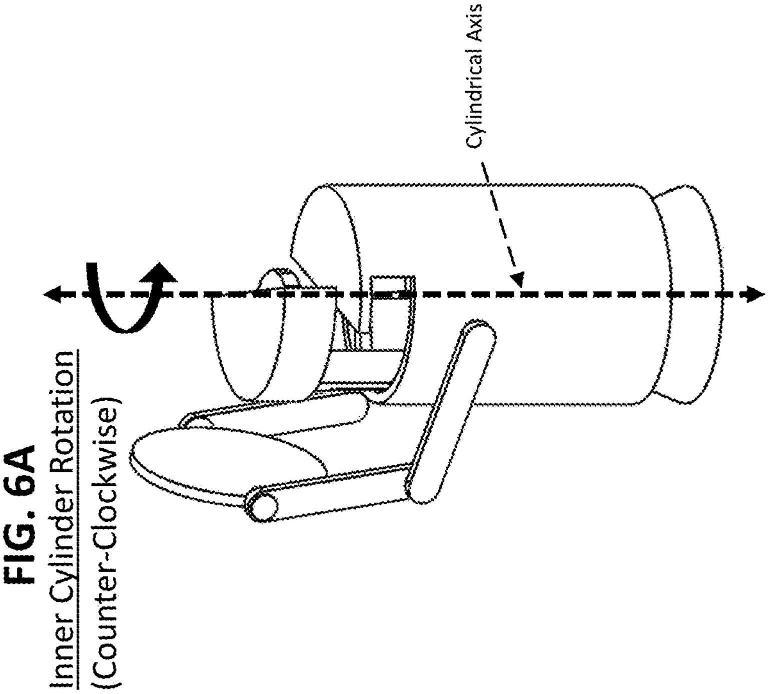
FIG. 6A
Inner Cylinder Rotation
(Counter-Clockwise)

Rotation at the Base of Spray Head (Counter-Clockwise)

Rotation at the Base of Spray Head (Clockwise)

Spray Disk Rotation
(Counter-Clockwise)

Spray Disk Rotation
(Clockwise)

Fully-Closed

Partial-Closed

Fully-Open

MAKEUP MACHINE WITH A COMPACT HOUSING

CROSS-REFERENCE TO RELATED APPLICATIONS

This application claims the benefit of U.S. Provisional Application No. 63/229,489 filed on Aug. 4, 2021, and U.S. Provisional Application No. 63/239,908 filed on Sep. 1, 2021.

TECHNICAL FIELD

Embodiments of the invention relate to a makeup machine that automatically moves a spraying device in multiple directions to apply a skin spray on a user.

BACKGROUND

Applying makeup to look one's best requires skills. To an unskilled person, the experience of applying makeup could be frustrating and the result could be far from expectation. Not everyone has the time and resources to seek help from a professional every time makeup is desired.

The advance in robotics, artificial intelligence, and control technologies brings about potential opportunities in automating cosmetics applications. For example, it has been shown that a robot can be trained to apply an eyeshadow brush to a person's face. For a makeup machine to be practical to a user, the machine needs to be versatile, compact, easy to use, and safe, among other properties. However, compactness and versatility are sometimes two competing goals. A machine with versatile features can be bulky. On the other hand, a compact machine typically does not have room to accommodate all the desired features.

Furthermore, a compact machine such as a handheld sprayer cannot apply cosmetics with precision as it requires manual movements by the user. The precision may be improved by a compact stationary machine; however, the compactness is generally a hindrance for wide-area coverage such as a cosmetic application on a user's face. A user of a compact stationary machine may be asked to physically reposition their head a number of times (e.g., facing front, facing right, and facing left) so that the machine can reach the user's face from side to side. The repositioning can cause the machine to misalign the different sides of the user's face and produce undesirable results.

Therefore, it is a challenge to design and build a makeup machine that is both versatile and compact.

SUMMARY

In one embodiment, a makeup machine includes a housing, a rotating platform, a spray head, moving means, and a controller circuit. The rotating platform is operative to rotate in the housing around a vertical center axis. The spray head is coupled to the rotating platform and is operative to receive a spray cartridge and cause the spray cartridge to spray a material contained therein on a target area of a user's skin. The moving means is operative to move the spray head vertically and horizontally relative to the target area. The moving means is coupled to the rotating platform and rotates with the rotating platform. The controller circuit within the housing controls the movements of the rotating platform and the moving means.

In another embodiment, a makeup machine includes a housing, a rotating platform, a spray head, a z-slider arm, a y-slider arm, an x-slider track, and a controller circuit. The rotating platform is operative to rotate in the housing around a vertical center axis. The spray head is coupled to the rotating platform and is operative to receive a spray cartridge and cause the spray cartridge to spray a material contained therein on a target area of a user's skin. The z-slider arm has a top-end attached to the spray head to enable vertical movements of the spray head. The y-slider arm includes a horizontal track along which the z-slider arm slides. The y-slider arm slides along the x-slider track. The x-slider track lies on the rotating platform and is perpendicular to the z-slider arm and the y-slider arm. The controller circuit within the housing controls the movements of the rotating platform, the y-slider arm, and the z-slider arm.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 6A and 6B illustrate inner cylinder rotations according to one embodiment.

DETAILED DESCRIPTION

Figure 2:
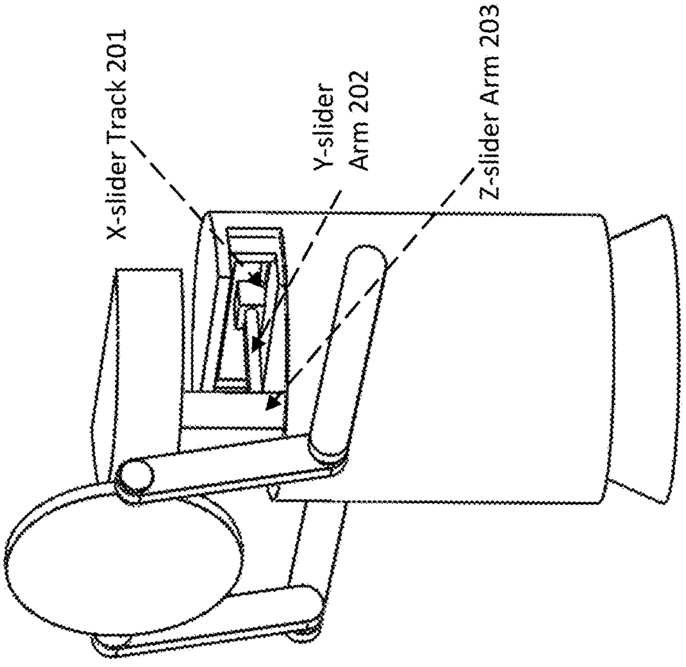
FIG. 2 illustrates an x-slider track, a y-slider arm, and a z-slider arm according to another embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Disclosed herein is a makeup machine having a compact housing, and, therefore, can be placed on a tabletop or a countertop with a minimal footprint. The housing of the machine stays stationary during machine operation. Components of the machine, such as a spray head, can be automatically deployed to extend outside the housing when in use and stowed inside the housing when not in use. A spray cartridge containing skin sprays can be inserted into the spray head before use and removed after use. The spray head is supported by a moving structure, and the moving structure is mounted on a rotating platform inside the housing. The moving structure and the rotating platform enable the spray head to move to a position optimal for spraying on a target area. As will be explained in the following description, the makeup machine is compact, versatile, easy to use, and safe. The movements of the moving structure and the rotating platform in multiple dimensions enable wide-area coverage such as the entire face of a user. The user can remain stationary in one position during the machine operation, and the moving structure moves the spray head around the user's face. Thus, the skin spray can be sprayed on the entire face with high precision without the user repositioning their head and without the aforementioned alignment issues.

The makeup machine applies skin spray at a target area; e.g., an area on a person's skin such as a person's face. The skin sprays, also referred to as a spray-on skin products, include cosmetics products, skincare products, pharmaceutical skin products, dermatological products, and the like. In some embodiments, the skin spray may be a liquid, a fluid, or a liquid-like material including liquid solution, fluid mixture, oil, lotion, or any materials of any viscosity that can be sprayed with compressed air. For simplicity of the following description, the skin spray may be referred to as a liquid. The process of applying atomized liquids to the user's skin may be referred to as an "application process." Although the term "makeup process" is sometimes used in this disclosure, it is understood that "makeup" is a non-limiting example for the use of the disclosed machine that sprays the liquid contents in a spray cartridge on a user's skin. Although the following description focuses primarily on a user's face, the apparatus and method of the present invention can apply to any part of the human body.

The spray cartridge disclosed herein can be used in any machine that can spray atomized liquids on a user's skin, and the makeup machine disclosed herein can use other types of spray cartridges not limited to the ones shown and described in this disclosure. In the drawings accompanying the detailed description, a spray disk of a round shape is shown as an example of a spray cartridge. It is understood that the makeup machine can use a spray cartridge of any shape not limited to a round shape.

Figure 1:
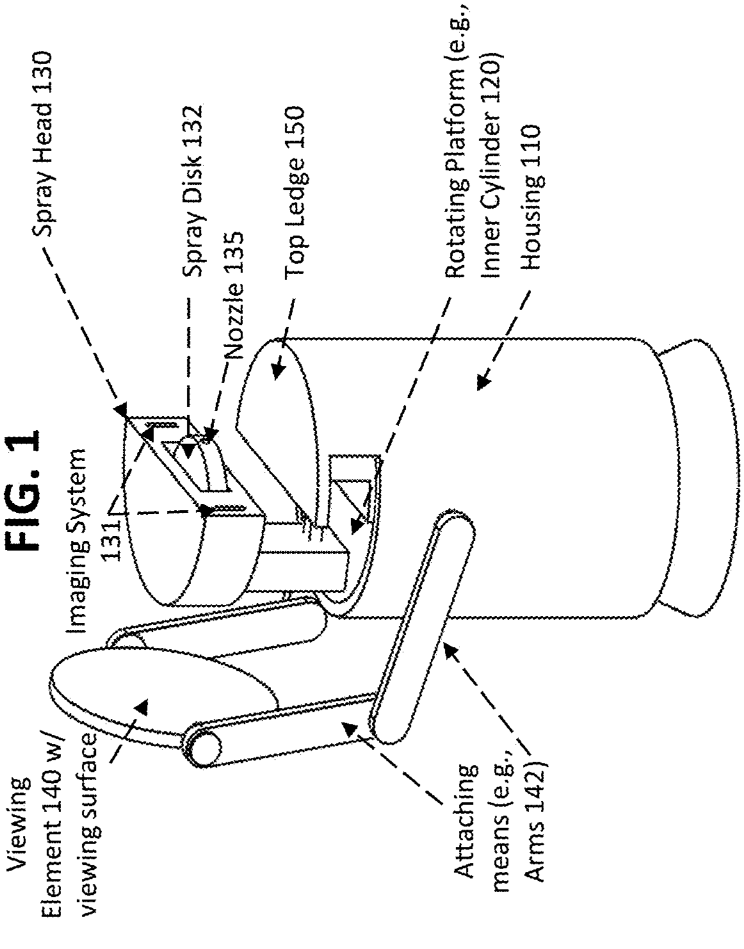
FIG. 1 is a diagram of a makeup machine according to one embodiment.

FIG. 1 is a diagram of a makeup machine 100 according to one embodiment. The makeup machine 100 includes a housing 110 and a rotating platform such as an inner cylinder 120. In an alternative embodiment, the rotating platform can have another shape different from a cylinder. The shape of the housing 110 can be cylindrical or substantially cylindrical. In some embodiments, a cross-section of the housing 110 may deviate from a circle and has a teardrop shape, an oval shape, or another geometrical shape that is stretched or compressed from a circle. Cross-sections taken at different heights of the housing 110 may have the same shape, substantially the same shape, or different shapes.

The inner cylinder 120 extends longitudinally along the height dimension (also referred to as the vertical direction) of the housing 110 and has a circular cross-section. The inner cylinder 120 can rotate around its center axis (also referred to as the cylindrical axis) to cause the spray head 130 disposed thereon, as well as other components attached to the inner cylinder 120, to rotate around the cylindrical axis. The housing 110 or the inner cylinder 120 may include one or more inner cavities (not shown) to store electrical, mechanical and/or electronics components including but not limited to one or more of: a motor, a battery, an air compressor, electrical wires, communication electronics to provide wireless connectivity (e.g., Bluetooth, Wi-Fi, and the like), one or more processors, and a memory module. In some embodiments, some of the components (e.g., the air compressor) may be located outside the housing 110 and connected to the components inside the housing via electrical and/or mechanical means. The memory module stores software executable by one or more processors. The software may include a user navigation interface to help the user to use the machine 100 and control software for controlling the machine operations. Components stored or embedded in the inner cylinder 120 may rotate with the rotational movement of the inner cylinder 120, or may remain stationary when the inner cylinder 120 rotates. In one embodiment, a top ledge 150 of the housing 110 may be used by the user as a chin support or a chin rest to stabilize the user's head. It is understood that FIG. 1 provides a non-limiting example of a makeup machine. The scope of this disclosure encompasses makeup machines having various dimensions, shapes, and/or sizes.

In the example of FIG. 1, a spray cartridge such as a spray disk 132 is shown to be inserted in the spray head 130 to spray one or more skin spray materials to a target area; e.g., a user's face. The spray disk 132 may include one or more nozzles 135 located on the periphery. In one embodiment, the spray disk 132 includes multiple partitions, and each partition includes a liquid tank for storing a liquid and a nozzle 135 for spraying the liquid stored in the corresponding liquid tank. Different liquid tanks may store different skin spray materials. Some of the nozzles 135 may have different shapes and/or sizes. In another embodiment, the spray disk 132 may contain a single liquid tank containing a single liquid material and a single nozzle. In such an embodiment, the spray disk 132 may be referred to as a pod. When the makeup machine 100 is in operation, a motor can drive the spray head 130 to rotate the spray disk 132, such that a selected nozzle 135 points to the target area of a user (hereinafter referred to as the target area). As mentioned before, the spray disk 132 is a non-limiting example of a spray cartridge having a shape that may be different from a disk (i.e., round) shape. The makeup machine 100 may rotate a spray cartridge of any shape as needed for the spraying operations.

In one embodiment, the user-facing side (also referred to as the front side) of the spray head 130 may include an imaging system 131, which uses depth-sensing technology to detect the depth and extrusions of the target area such as a user's face. The imaging system 131 may include a number of cameras such as stereo cameras or other types of depth perception cameras, and may also include sensors such as frequency sensors (e.g., sensors that operate in the ultrasonic, infrared, low-frequency ultraviolet frequency range and/or another frequency range). Depth sensing enables the imaging system 131 to create an accurate 3D mesh and accurately map the 3D mesh onto the target area. For example, when performing makeup on a user's face, an accurate 3D mesh allows the machine 100 to fit a 3D makeup design onto the face with precision. The imaging system 131 may also include circuitry and/or software to detect depth using methods such as a contrast ratio method, a laser meter method, a focusing method, etc. The images captured by the imaging system 131 can be used by the hardware and/or software in the machine 100 to locate the target area, create a 3D profile (e.g., a 3D mesh) of the user's face, and/or recognize the user's identity, among other functions. The imaging system 131 may also include lights, which may include one or more of: light-emitting diode (LED) lights, diffused lights, etc., to illuminate the target area. The imaging system 131 may also include one or more of: motion sensors, temperature sensors, light sensors, ultrasonic sensors, etc. It is understood that the machine 100 may include any number of cameras, sensors, lights and/or other user-interface modules, which may be installed anywhere on the spray head 130 and/or other parts of the machine 100 (e.g., attached to or embedded in the housing 110, in a viewing element 140 to be described below, etc.).

In one embodiment, the machine 100 includes an audio user interface such as a speaker. During operation, the machine 100 may provide step-by-step audio commands through the speaker to guide the user. For example, the machine 100 may generate audio commands through the speaker to remind the user to keep the eyes shut when makeup is being sprayed. The audio commands may also include suggestions, warnings, music, or other audio signals.

In one embodiment, an element with a viewing surface (referred to as a viewing element 140) is attached to the housing 110. The front (i.e., user-facing) side of the viewing element 140 includes a viewing surface, which may occupy the entire front side or a portion of the front side of the viewing element 140. In one embodiment, the viewing surface may be a mirror that shows a reflection of the user; the mirror may be a plane mirror or a magnifying mirror. In another embodiment, the viewing element 140 may be or may include a digital display panel to display a digital image. In yet another embodiment, the viewing element 140 may include a combination of a mirror and a digital display panel. The display panel may be the same as or similar to a computer and/or smartphone display screen. The digital image may be a digital image of the user captured by the imaging system 131 or by another camera, an augmented reality (AR) digital image (e.g., a makeup or styling choice superimposed on the user's image), an image or image sequence (e.g., a video) recommended for or selected by the user, a real-time online consulting session with a makeup coach or another party of interest, a website such as a social media site, and the like. The viewing element 140 may include cameras, sensors, microphones, speakers, and lighting. In one embodiment, the viewing element 140 contains lighting that can change according to the user's input, or automatically according to the sensor input; e.g., the sensors embedded in the viewing element 140 or elsewhere on the machine 100. The viewing element 140 may also include a software interface embedded in the viewing surface to help the user to navigate the many functions of the machine 100.

The viewing element 140 is attached to the housing 110 via an attaching means; e.g., two arms 142 in FIG. 1. Referring to FIG. 1, each arm 142 includes an upper piece connected to a lower piece by a middle joint. The upper piece is attached to the viewing element 140 by an upper joint and the lower piece is attached to the housing 110 by a lower joint. The upper, middle, and lower joints allow both pieces of the arm 142 to rotate clockwise and counterclockwise around the respective joint axes, such that the viewing element 140 can be positioned and oriented suitably for the user. In one embodiment, the arms 142 may be adjusted to move the viewing element 140 to a first position at a distal side (i.e., the backside, which is the farthest side from the user) of the housing 110, a second position at a proximal side (i.e., the front side, which is the closest side to the user) of the housing 110, and other positions in between the first and the second positions. During the spraying operation of the machine 100, the viewing element 140 may be positioned at the first position. The viewing element 140 may be positioned at the second position to allow the user to have a closer look at him/herself in the mirror before and after the spraying operation.

In one embodiment, each arm 142 may include a built-in mechanical belt, which can be driven to automatically adjust the position and orientation of the viewing element 140; e.g., to a user-preset position. In an alternative embodiment, the arms 142 may be manually adjusted by a user.

It is understood that the viewing element 140 and the arms 142 in FIG. 1 provide a non-limiting example; it is understood that the viewing element 140 and/or the viewing surface may have any shape such as rectangular, round, square, etc., and the viewing element 140 may be attached to the housing 110 by an attaching means different from the arms 142 shown in FIG. 1. For example, the attaching means may be a single arm, a telescopic pole, or another structure; may be secured to a side or both sides of the viewing element 140 or the back of the viewing element 140; and may be positioned along any suitable dimension or dimensions. The attaching means enables the viewing element 140 to be foldable for stowage and placed in any specified position as desired for the makeup process.

The spray head 130 can make translational movements in three orthogonal directions; namely, the directions along the x-axis, the y-axis, and the z-axis. The z-axis is parallel to the cylindrical axis of the inner cylinder 120. The x-axis and the y-axis define an X-Y plane (i.e., the horizontal plane) that is perpendicular to the z-axis. The x-axis, the y-axis, and the z-axis are not stationary axes; they all rotate with the inner cylinder 120. When the inner cylinder 120 is in an initial position (i.e., having zero-degree rotation), the y-axis points to the user seated in front of the machine 100. A y-axis movement of the spray head 130 moves the spray head 130 closer to or farther away from the target area; an x-axis movement of the spray head 130 moves the spray head 130 in a direction orthogonal to the y-axis movement on the horizontal plane, and a z-axis movement of the spray head 130 moves the spray head 130 up or down with respect to the target area. As will be described below with reference to FIG. 2, the x-axis, the y-axis, and the z-axis are aligned with an x-slider track 201, a y-slider arm 202, and a z-slider arm 203, respectively.

Figure 3A:
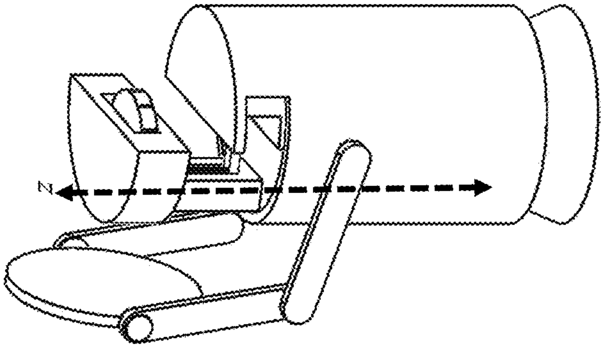
FIGS. 3A and 3B illustrate z-axis movements according to one embodiment.
Figure 3B:
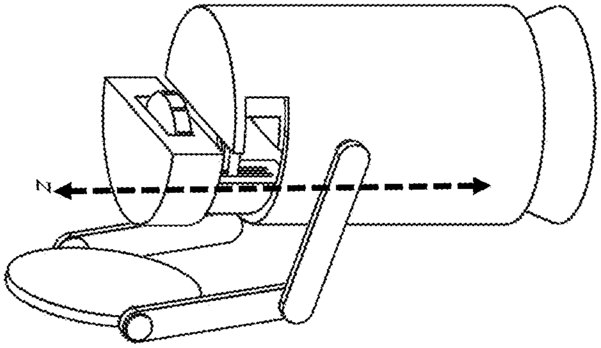

Referring to FIG. 2, FIG. 3A, and FIG. 3B, the z-slider arm 203 is vertically oriented on top of the inner cylinder 120 and extends longitudinally along the z-axis, which is parallel to the cylindrical axis. The top end of the z-slider arm 203 is attached to the spray head 130. The height of the z-slider arm 203 can be adjusted (i.e., lengthened and shortened) such that the spray head 130 can be positioned at a height suitable for the target area. In one embodiment, the z-slider arm 203 is composed of a set of telescopic tubes that can extend and retract longitudinally for height adjustment.

Figure 4A:
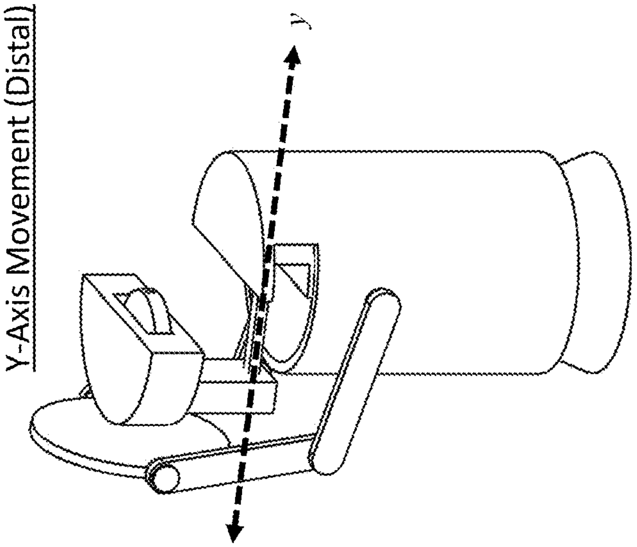
FIGS. 4A and 4B illustrate y-axis movements according to one embodiment.
Figure 4B:
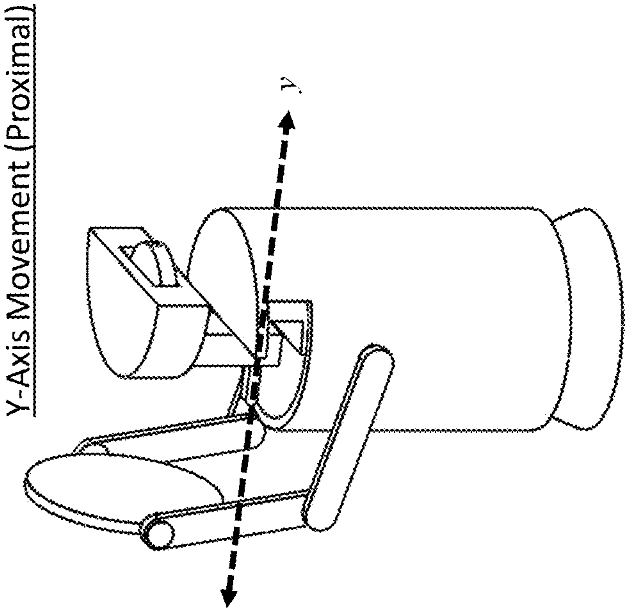

Referring to FIG. 2, FIG. 4A, and FIG. 4B, the y-slider arm 202 includes a first horizontal track on which the z-slider arm 203, as well as the spray head 130 thereon, can move towards or away from the target area. One end of the y-slider arm 202 is attached to the x-slider track 201, and the other end may extend longitudinally past the outer perimeter of the housing 110. The extension of the y-slider arm 202 allows the z-slider arm 203 to slide past the outer perimeter of the housing 110 to lengthen the distance between the spray head 130 and the target area, and, therefore, enable a greater coverage range of the spray.

Figure 5A:
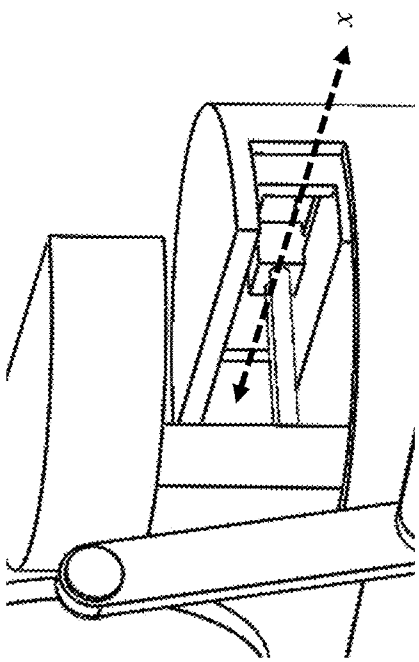
FIGS. 5A and 5B illustrate x-axis movements according to one embodiment.
Figure 5B:
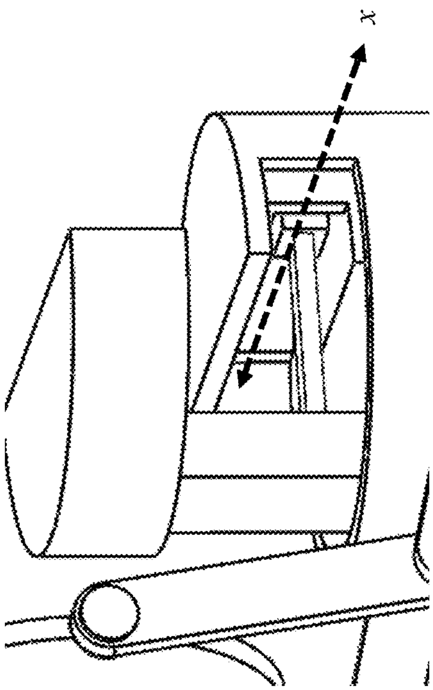

Referring to FIG. 2, FIG. 5A, and FIG. 5B, the x-slider track 201 is a horizontal track that lies on a rotating platform such as the inner cylinder 120. The x-slider track 210 is orthogonal to the y-slider arm 202 and the z-slider arm 203. The y-slider arm 202 can slide on the x-slider track 201 to move the z-slider arm 203, as well as the spray head 130 thereon, from side to side relative to the target area. The x-slider track 201 in a fully closed position sits under the top ledge 150 of the housing 110, and can rotate out the top ledge 150 with the rotational movement of the inner cylinder 120.

In addition to the three translational movements, the machine 100 can also make three types of rotational movements. The machine 100 in operation can combine any of these translational movements and rotational movements to aim the nozzle 135 at an angle best suited for spraying application. Referring to FIGS. 6A and 6B, the inner cylinder 120 is operative to make a first rotational movement by turning clockwise and counterclockwise around the cylindrical axis. This first rotational movement moves the spray head 130 around the cylindrical axis.

Figure 7A:
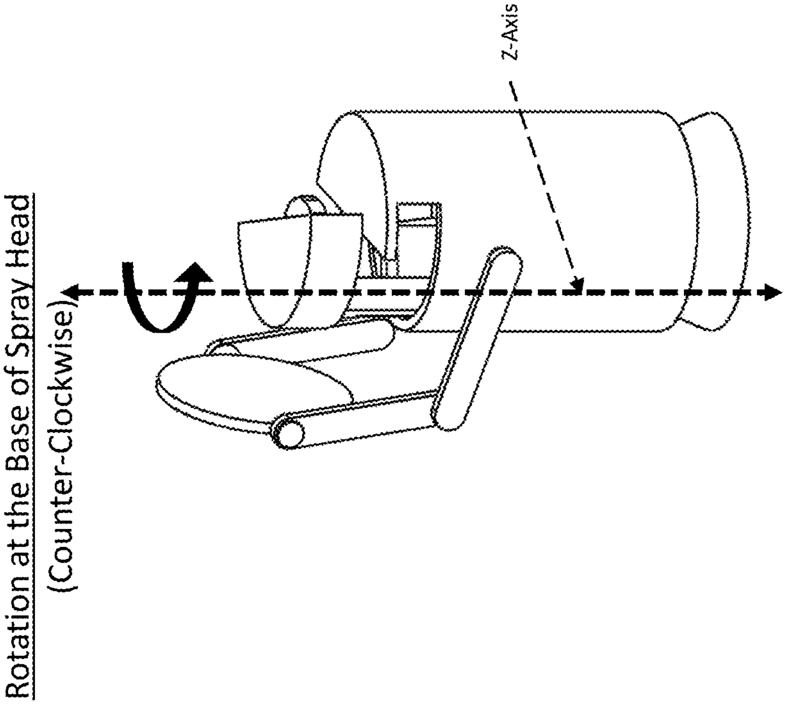
FIGS. 7A and 7B illustrate spray head rotations according to one embodiment.
Figure 7B:
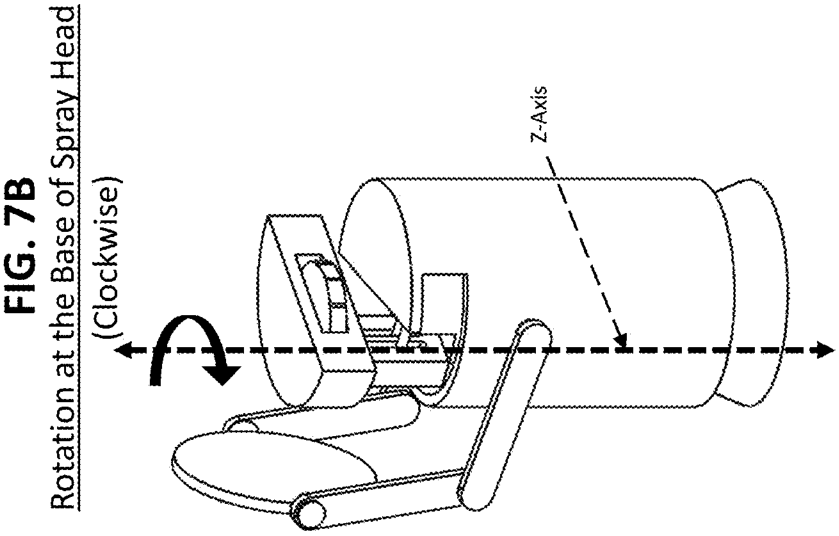

Moreover, as shown in FIGS. 7A and 7B, the machine 100 can make a second rotational movement by turning the spray head 130 clockwise and counterclockwise horizontally at the base of the spray head 130 where the spray head 130 connects to the z-slider arm 203. The rotation axis of the second rotational movement is the z-axis along the z-slider arm 203. Both the first and the second rotational movements change the orientation of the spray head 130 with respect to the target area.

Figure 8A:
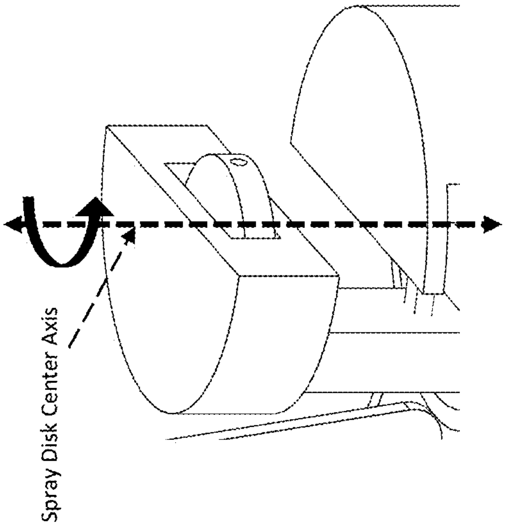
FIGS. 8A and 8B illustrate spray disk rotations according to one embodiment.
Figure 8B:
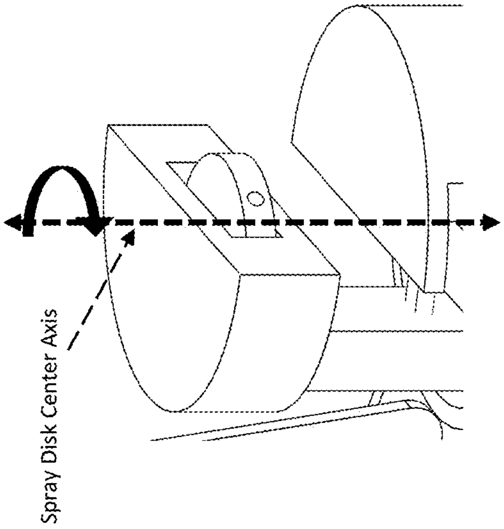

Additionally, as shown in FIGS. 8A and 8B, the machine 100 can make a third rotational movement by turning the spray disk 132 (and, therefore, the nozzle 135) clockwise and counterclockwise during spraying to create a diffusion effect, or to select a different nozzle on the spray disk 132. The orientation of the spray head 130 does not change in the third rotational movement; it is spray disk 132 that is rotated by the spray head 130. The rotation axis of the third rotational movement is the disk center axis of the spray disk 132. The three types of rotational movements may be performed independently of each other. These rotational movements may be performed sequentially in any order or concurrently.

Figure 9C:
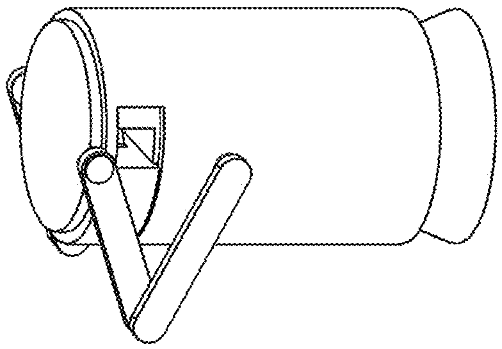
FIGS. 9A, 9B, and 9C illustrate a makeup machine fully opened, partially closed, and fully closed, respectively, according to one embodiment.
Figure 9B:
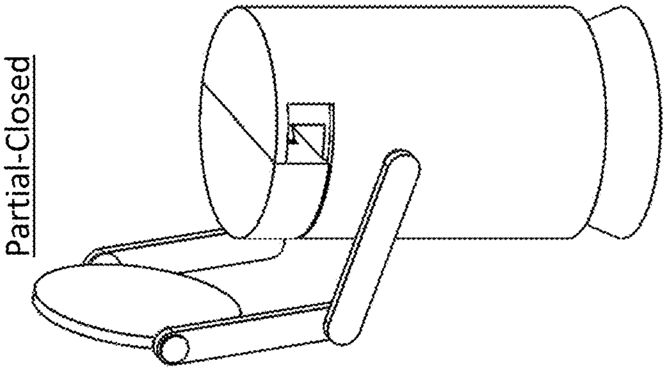
Figure 9A:
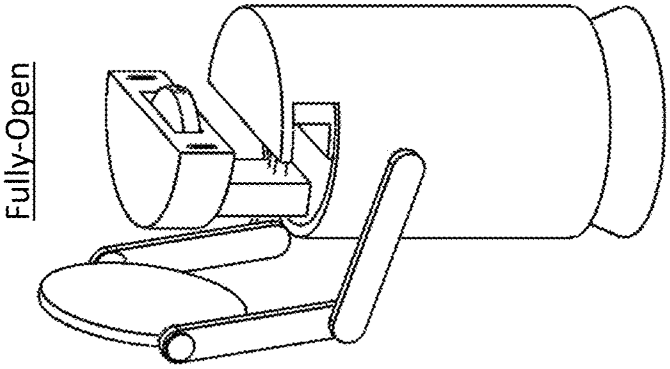

FIGS. 9A, 9B, and 9C illustrate the makeup machine 100 fully opened, partially closed, and fully closed, respectively, according to one embodiment. In a fully-opened position, the z-slider arm 203 extends upwards to move the spray head 130 above the top ledge 150 of the housing 110, and the viewing element 140 is opened up with its front side facing the target area. When partially or fully closed, the spray head 130, the x-slider track 201, the y-slider arm 202, and the z-slider arm 203 can retract into (or stay within) the inner cavity of the housing 110, and the top surface of the spray head 130 is flush with the top ledge 150 of the housing 110. When the makeup machine 100 is fully closed, the viewing element 140 can be folded down with its front side facing the top side of the housing 110; more specifically, onto the top surface of the spray head 130 and the top ledge 150. In one embodiment, the viewing element 140 may have the same or substantially the same size as the top surface of the housing 110.

In one embodiment (not shown), the lower piece of the arm 142 can slide past the lower joint and move downwards alongside the housing 110 towards the bottom of the housing 110. When the viewing element 140 reaches the fully-closed position, the viewing element 141 rests on top of the housing 110 with face side down, and each arm 142, with both the upper and lower pieces aligned in a substantially vertical line, rest on a side of the housing 110. Thus, the arms 142 (more specifically, the middle joints) in the fully-closed position do not protrude from the side of the housing 110 in this embodiment.

Referring to FIGS. 1 and 2, an example of makeup machine 100 movements is described as follows. In this example, the makeup machine 100 is in position to spray a skin spray onto a target area (e.g., a user's left cheek). The movements can be made in any order not limited to the order described herein; in some embodiments, some of the movements may be made concurrently. The machine 100 makes a z-axis movement to raise the spray head 130 higher than the top ledge 150 of the housing 110. The machine 100 also makes a y-axis movement to move the z-slider arm 203 (and the spray head 130) to the distal end of the y-slider arm 202 (away from the target area). The machine 100 also makes an x-axis movement to move the y-slider arm 202 (and the spray head 130) all the way to the left end of the x-slider track 201. The machine 100 also makes the first rotational movement by rotating the inner cylinder 120 around the cylindrical axis to position the spray head 130 at an appropriate angle to the target area. The first rotational movement can rotate the spray head 130 around the cylindrical axis by more than 180 degrees. The y-slider arm 202 may extend longitudinally to position the z-slider arm 203 and the spray head 130 outside the outer perimeter of the housing 110. The machine 100 also makes the second rotational movement by rotating the spray head 130 around its base. The machine 100 can also make the third rotational movement by rotating the spray disk 132 around the spray disk's center axis to select an appropriate nozzle 135 and/or produce a diffusion effect.

Figure 10:
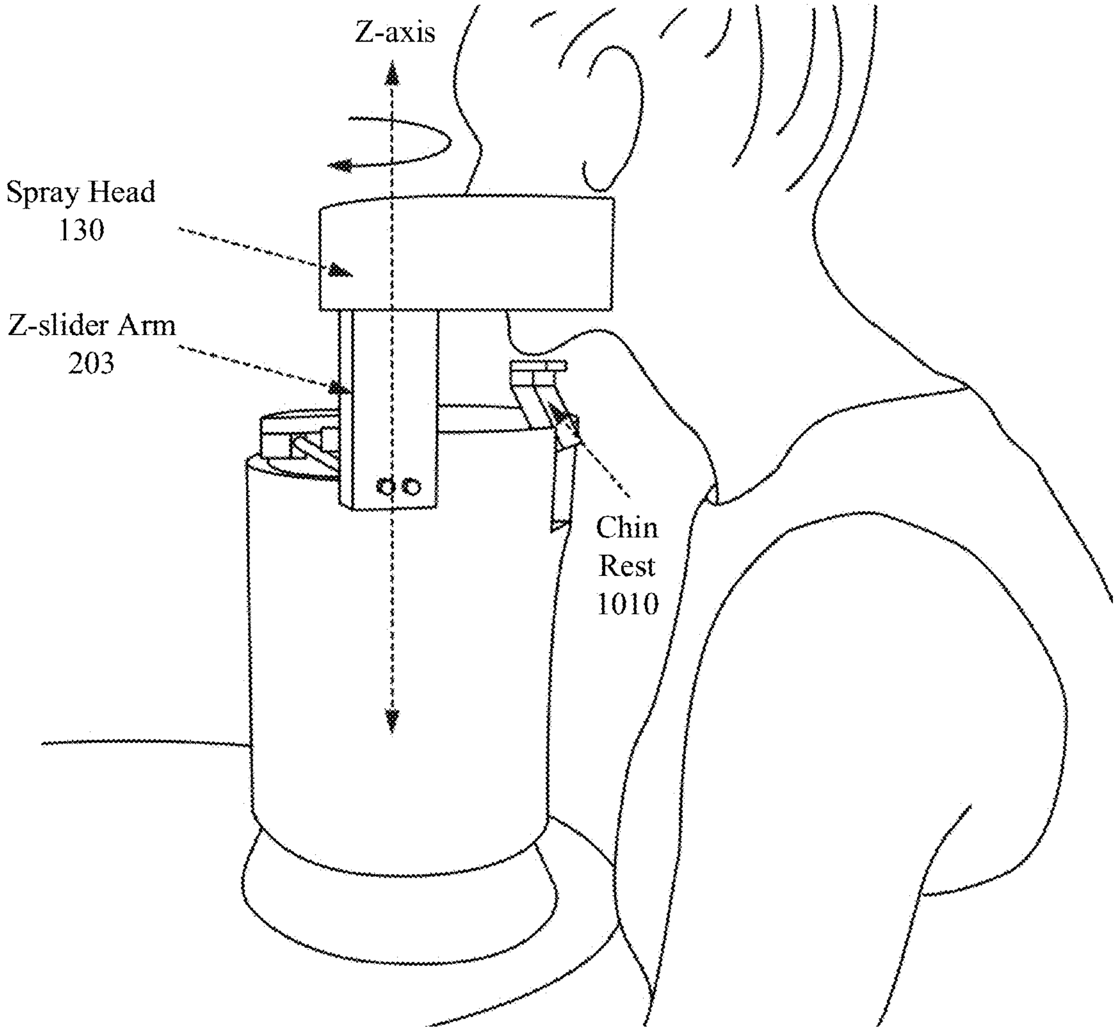
FIG. 10 illustrates a built-in chin rest according to one embodiment.

FIG. 10 illustrates a built-in chin rest 1010 according to one embodiment. Referring also to FIGS. 1 and 2, the chin rest 1010 is adapted to be pulled out from the front surface of the housing 110 to a position above the top ledge 150 of the housing 110 to thereby provide support for a user's chin and help with positioning the user's head to the correct height and distance from the spray head 130. The chin rest 1010 functions to position the user's head in an optimal usage position (e.g., with respect to depth and height) and posture (for the optimal spraying capability on the skin to avoid wrinkling) A sensor may be installed in the chin rest 1010 to detect whether or not the user's chin is on the chin rest 1010 and, as a safety feature, allow the machine operation to be stopped if the user leaves for any reason. In one embodiment, the top end of the chin rest 1010 may be hinged to the front side of the housing 110; the unhinged bottom end may be pulled out and swung upwards to a locked position on top of the top ledge. When not in use, the chin rest 1010 can be folded down and pushed back to the front surface of the housing 110.

Figure 11A:
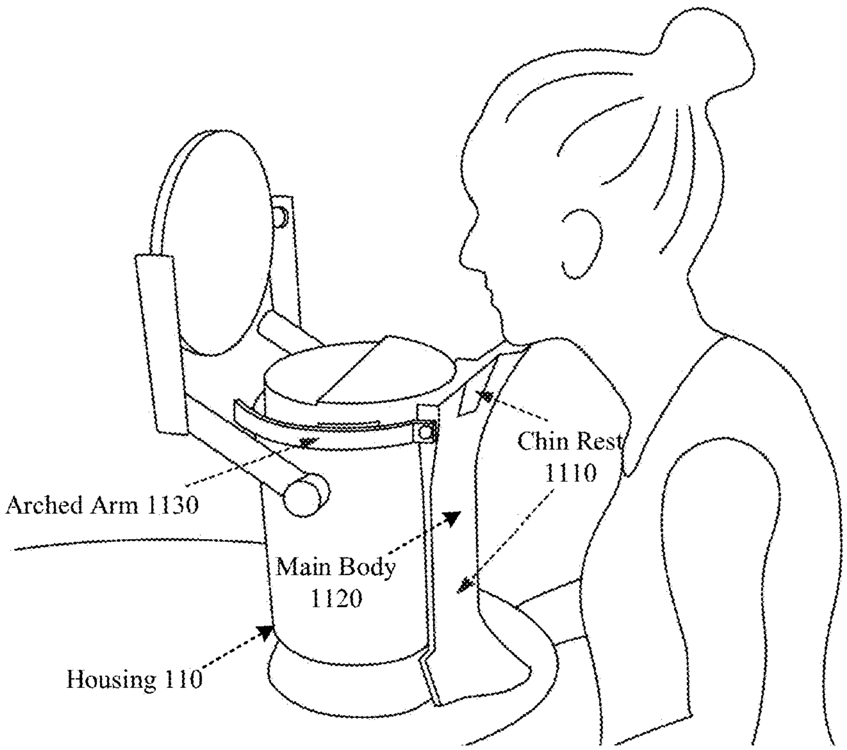
FIGS. 11A and 11B illustrate a detachable chin rest and attached arched arms according to one embodiment.
Figure 11B:
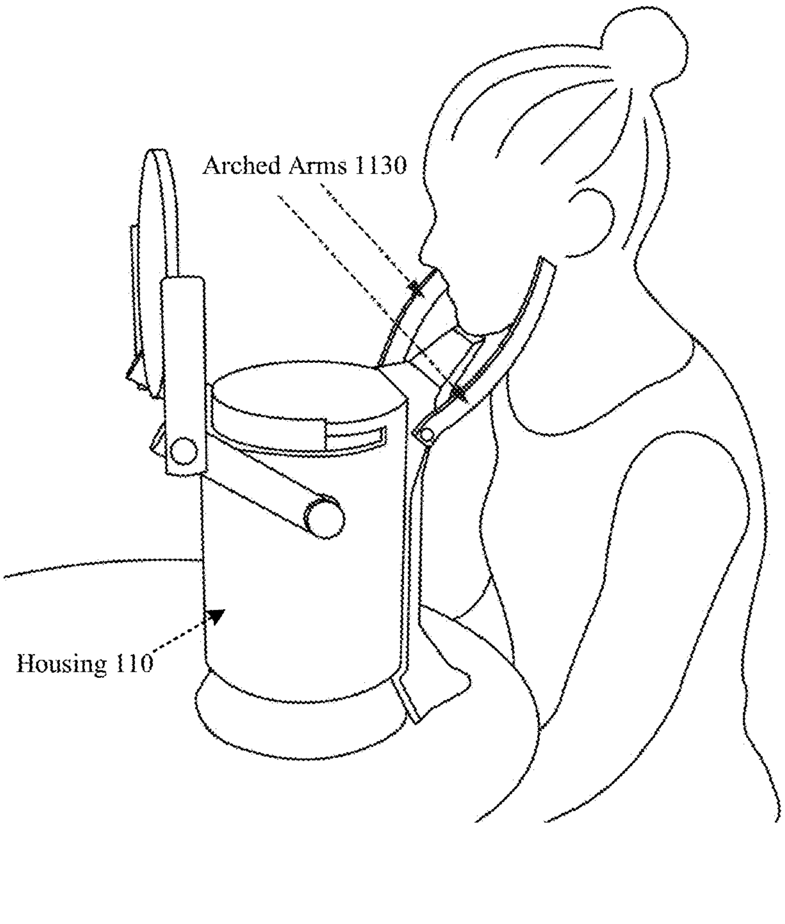

FIGS. 11A and 11B illustrate a detachable chin rest 1110 according to one embodiment. Referring also to FIG. 1, the chin rest 1110 as shown is attached to the user-facing side (i.e., front side) of the housing 110, and extends longitudinally along the front side of the housing 110. The chin rest 1110 has a top end for supporting a user's chin and a bottom end flush with a bottom surface of the housing 110. The chin rest 1110 is detachable from the housing 110. In some embodiments, the chin rest 1110 can be attached to any device or machine, not limited to the makeup machine 100. The attachment mechanism may include magnets, notches, and the like. In one embodiment, the chin rest 1110 includes a main body 1120 and a pair of arched arms 1130. The main body 1120 has an elongated shape with a base to stand on and a top surface for receiving a user's chin. In one embodiment, the main body 1120 has an arch-shaped side profile from the top to the base, where the base has the largest cross-section. The large base ensures that the machine 100 does not tip over when the weight of the user's head is placed on the top. In another embodiment, the main body 1120 may have the same cross-sections throughout the longitudinal direction.

In one embodiment, the arched arms 1130 are attached to the main body 1120 at one end. When not in use, the arched arms 1130 can wrap around the housing 110. When in use, the arched arms 1130 can be swung upwards toward the user to press against both sides of the user's head or ears. The arched arms 1130 can help to stabilize the user's head during operations of the machine 100. In one embodiment, the arched arms 1130 contain audio electronics and the wiring of an earphone. The tips of the arched arms 1130 can be stretched out to press against the user's ears to provide audio signals such as suggestions, warnings, music, or other audio to the user.

Figure 12A:
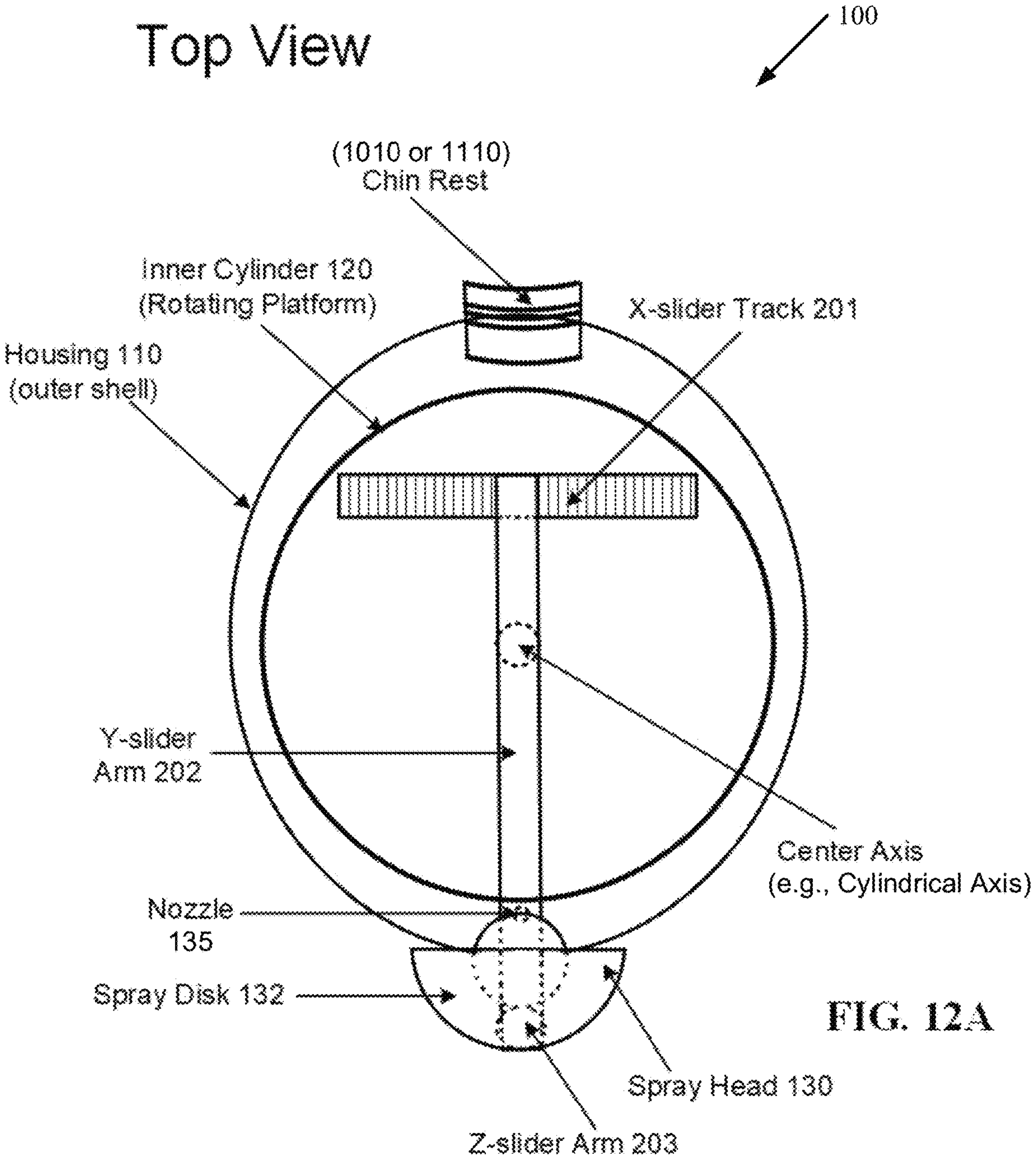
FIGS. 12A and 12B illustrate top views of a makeup machine according to one embodiment.
Figure 12B:
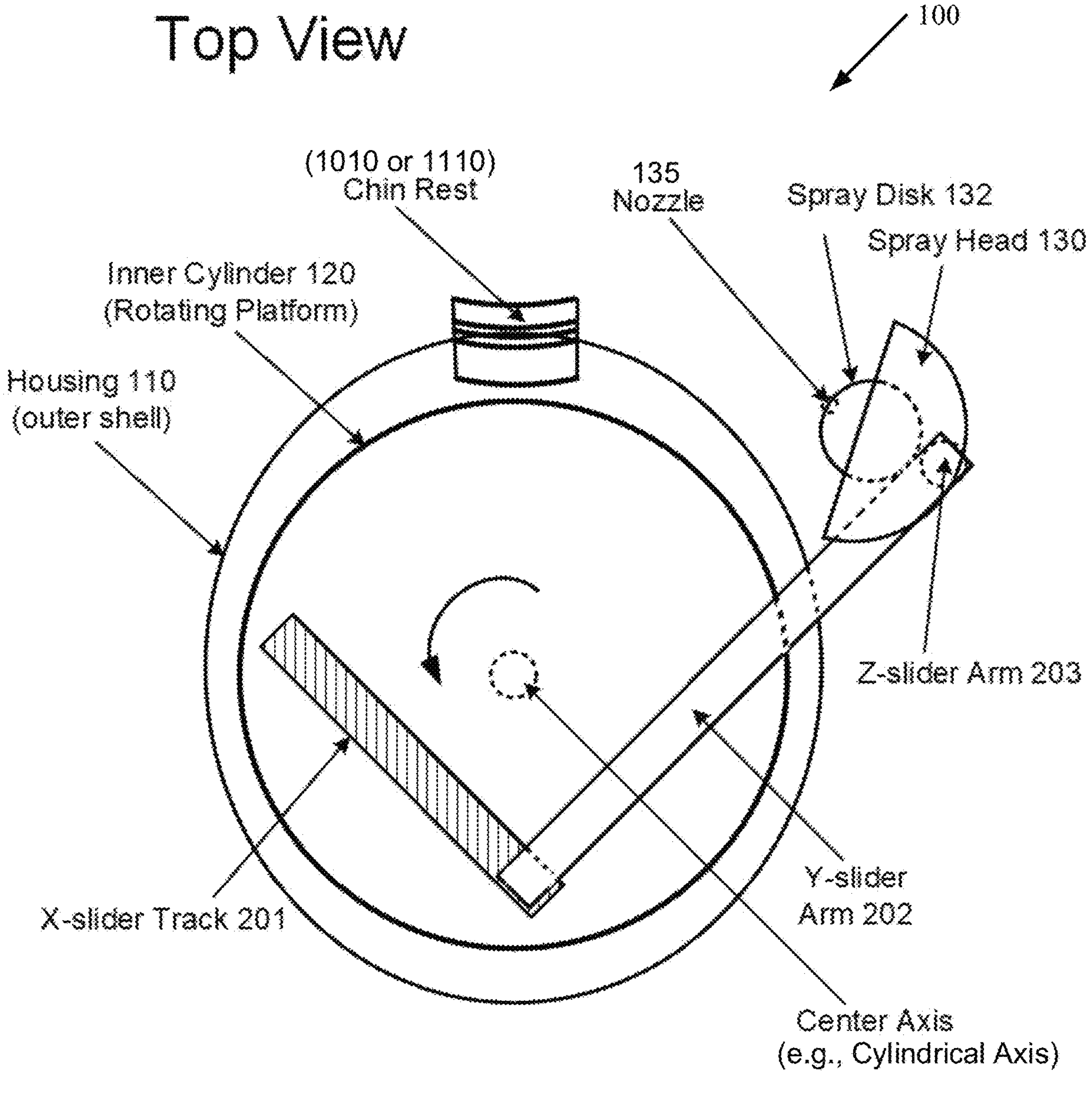

FIGS. 12A and 12B are top views of a makeup machine (e.g., the machine 100) according to one embodiment. The top ledge of the housing 110 is not shown in this example for simplicity of illustration. The housing 110 (also referred to as the body shell) has an outer wall and an inner wall. The outer wall in this example is substantially cylindrical. In alternative embodiments, the outer wall may have any shape not limited to a cylinder. As a non-limiting example, the top view of the outer wall may have a teardrop shape, where the tip of the teardrop is notched to house a chin rest. The outer wall and the inner wall of the housing may have different shapes; e.g., the top view of the outer wall may have a notched teardrop shape and the top view of the inner wall may have a circular shape or near-circular shape. Inside the housing 110 is a rotating platform, which is the inner cylinder 120 in this example. In alternative embodiments, the rotating platform may have any shape not limited to a cylinder.

In FIG. 12A, the inner cylinder 120 is in an initial position; that is, the inner cylinder 120 has zero-degree rotation. The y-slider arm 202 is extended outside the outer wall of the housing 110. In FIG. 12B, the inner cylinder 120 is rotated counterclockwise from the initial position, such that the positions of the x-slider track 201, the y-slider arm 202, and the z-slider arm 203 are also rotated with the inner cylinder 120. It is understood that FIGS. 12A and 12B provide non-limiting examples. A makeup machine according to embodiments of the invention may have dimensions similar to but deviate from the embodiment shown in FIGS. 12A and 12B.

Figure 13A:
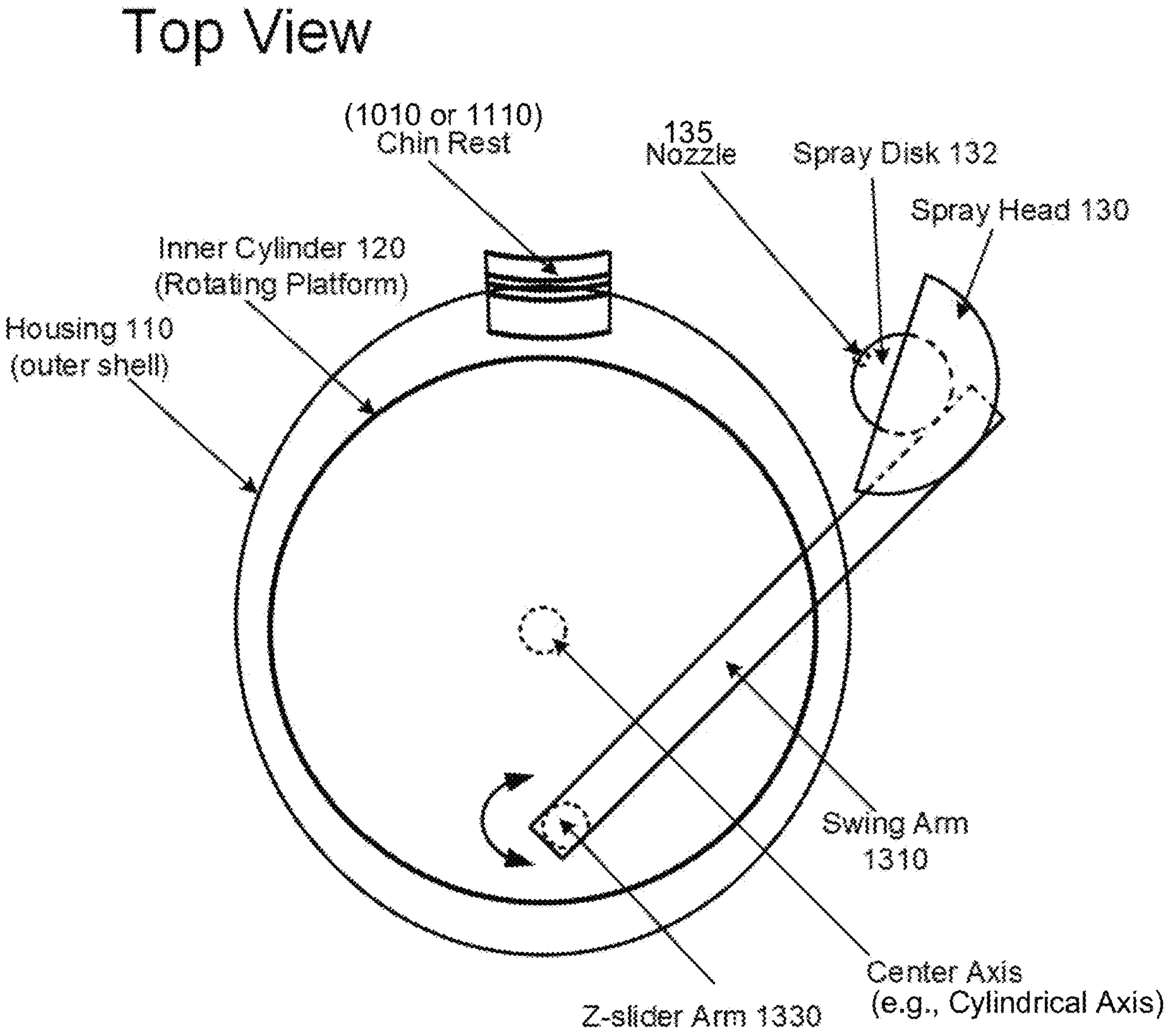
FIGS. 13A and 13B illustrate a makeup machine with a swing arm according to one embodiment.

FIG. 13A illustrates a top view of a makeup machine 1300 according to another embodiment. In this embodiment, the machine 1300 has a swing arm 1310 instead of an x-slider track and a y-slider arm. The base of the swing arm 1310 is connected to the top end of a z-slider arm 1330. The swing arm 1310 can rotate clockwise and counterclockwise around the base. In one embodiment, the swing arm 1310 may be telescopic; that is, it can extend and retract to adjust the position of the spray head 130. The rotation of the swing arm 1310 and the rotation of the inner cylinder 120 enable the spray disk 130 to move from side to side with respect to the target area. Additionally, the spray head 130 can rotate around its base, where the spray disk 130 connects to the swing arm 1310. The rotation movements and the z-axis movement of the spray head 130 along the swing arm 1310 enable the spray head 130 to move to a wide range of positions. The spray head 130 is operative to receive the spray disk 132, rotate the spray disk 132 around a vertical disk center axis, and cause the spray disk 132 to spray a skin spray material contained therein on a target area of a user's skin. The rotations of the spray disk 132 create a diffusion effect and/or enable the selection of a different nozzle on the spray disk 132.

Figure 13B:
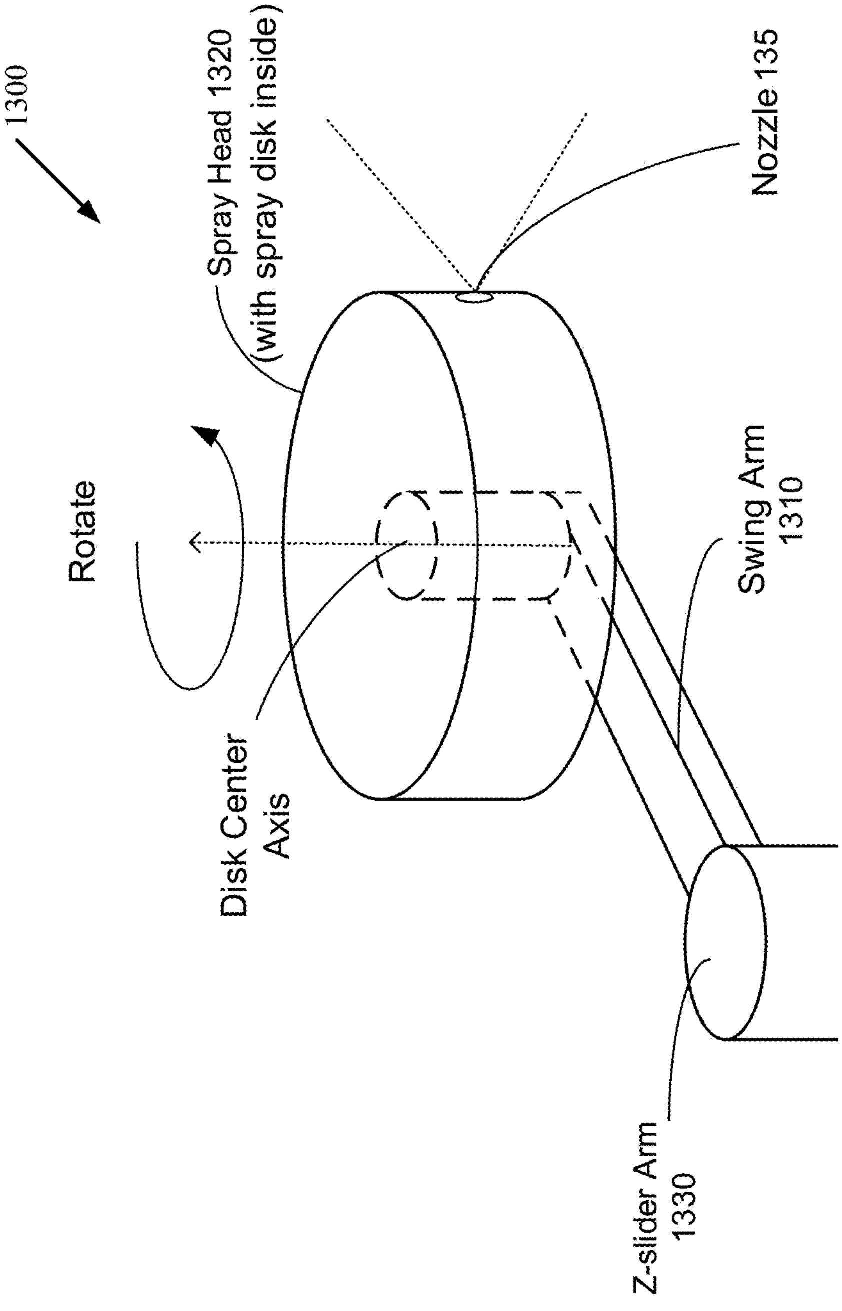

FIG. 13B is a diagram illustrating a spray head 1320 on the machine 1300 according to one embodiment. The spray head 1320 in this example is a circular case, which can rotate around its center. In one embodiment, the spray head 1320 has a top lid, which can open upwards to receive the spray disk 132. In one embodiment, the spray head 1320 has a bottom lid, which can open downwards to receive the spray disk 132. In FIG. 13A, the spray head 130 is a half-circle case, which includes a slit opening on the side from which the spray disk 132 can be inserted. It is understood that a spray disk and a spray head used by the makeup machine disclosed herein can have any shape, and the examples of the spray disk 132 and the spray head 1320 are non-limiting.

Figure 14:
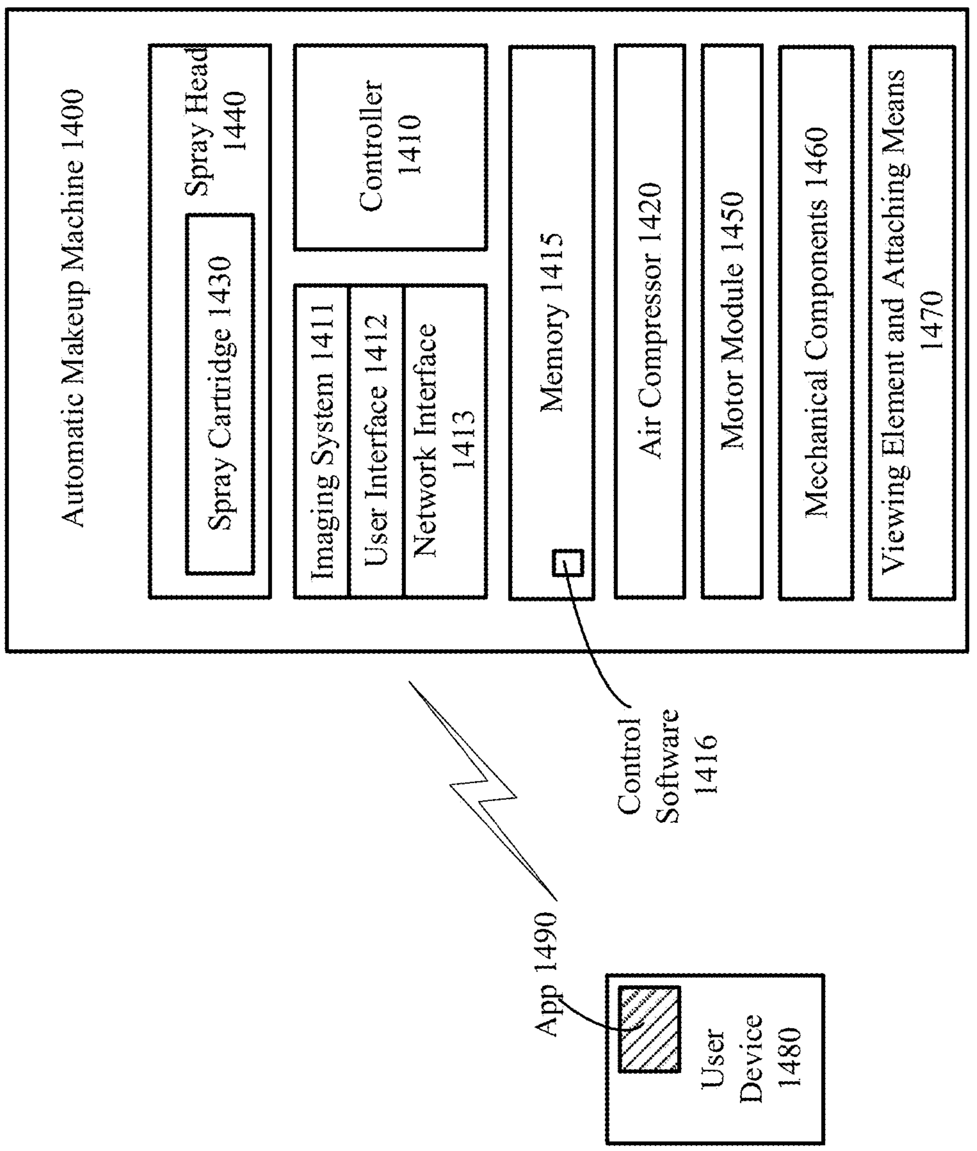
FIG. 14 is a block diagram of a makeup machine according to one embodiment.

FIG. 14 is a block diagram illustrating an automatic makeup machine 1400 ("the machine 1400") according to one embodiment. The machine 1400 may be an example of the aforementioned machine 100 and machine 1300. It is understood the embodiment of FIG. 14 is simplified for illustration purposes. Additional hardware components may be included. The machine 1400 includes a spray head 1440 in which a spray cartridge 1430 may be installed and may be removed after use. In one embodiment, the spray cartridge 1430 may contain multiple liquid tanks and corresponding nozzles. In one embodiment, the spray cartridge 1430 may contain a single liquid tank and a single nozzle. The spray head 130 and the spray disk 132 in FIG. 1 are non-limiting examples of the spray head 1440 and the spray cartridge 1430, respectively.

The machine 1400 includes a controller 1410, which may further include processing hardware such as one or more general-purpose processors, special-purpose circuits, or a combination of both. The controller 1410 is coupled to a memory 1415. The memory 1415 may include dynamic random access memory (DRAM), SRAM, flash memory, and other non-transitory machine-readable storage media; e.g., volatile or non-volatile memory devices. In one embodiment, the memory 1415 may store instructions which, when executed by the controller's processing hardware, cause the controller 1410 to control the automatic makeup operations and movements of the machine 1400, as well as the movements and spraying actions of the spray cartridge 1430. The controller 1410 may automatically control the air pump valve or air pump to output the air volume needed for the optimal performance to control the flow of skin spray to the nozzle of the spray cartridge 1430.

The machine 1400 includes a motor module 1450, which further includes a number of motors. Under the control of the controller 1410, the motor module 1450 enables the movements of the spray head 1440 and the rotation of the spray cartridge 1430. Although FIG. 14 shows the motor module 1450 as a single block, it is understood that the motor module 1450 may include multiple motors located at multiple locations in the machine 1400 for controlling different movements of the spray head 1440 and the spray cartridge 1430. The machine 1400 further includes an air compressor 1420 to supply compressed air to the spray cartridge 1430 under the command of the controller 1410. In some embodiments, the air compressor 1420 may be located outside the housing of the machine 1400 and may be connected to the components inside the machine housing via electrical wiring and air tubes. In some embodiments, the air compressor 1420 and the machine housing may be placed on different surfaces; e.g., the machine housing on a tabletop and the air compressor 1420 on the floor. Placing the air compressor 1420 outside the machine housing may reduce vibration and noise, which are not only unpleasant to the user but also decrease the accuracy of spraying operations. The machine 1400 further includes mechanical components 1460 such as robotic components to move the spray head 1440 under the command of the controller 1410. In one embodiment, the machine 1400 further includes a viewing element and attaching means 1470; a non-limiting example is the viewing element 140 and the arms 142 shown in FIG. 1.

The controller 1410 executes control software 1416 stored in the memory 1415 to control the makeup process including the determination and customization of machine movements. In one embodiment, the machine 1400 further includes an imaging system 1411 (e.g., the imaging system 131 in FIG. 1), which can capture a 3D profile of the target area, such as a user's 3D facial image. According to the 3D profile, the controller 1410 can execute the control software 1416 to determine a sequence of positions and orientations of the spray head 1440 to apply or spray liquids from the spray cartridge 1430. The controller 1410 then instructs the motor module 1450 to move the spray head 1440 according to the sequence of positions and orientations. The imaging system 1411 can also be used to monitor the liquid application process (e.g., a makeup process). The controller 1410 may use the information from the cameras to ensure safety and proper usage of the machine 1400. In one embodiment, the spray cartridge 1430 or the spray head 1440 may be marked with a number of fiduciary markings. One or more disk-facing cameras may be installed on the part of the machine 1400 that faces the spray head 1440, such that during an application session the disk-facing cameras can continuously monitor the locations and orientations of the spray disk 1430 based on the fiduciary markings. One or more user-facing cameras may monitor the location and orientation of the user's face. From the monitored data, the controller 1410 can determine the distance and angle between the spray cartridge 1430 and the user's face to further determine whether it is safe to apply makeup to the face.

In one embodiment, the machine 1400 may include a user interface 1412 such as a graphical user interface (GUI), through which the controller 1410 can communicate with the user; e.g., regarding the makeup process and color options, and guide the user through the makeup process. In one embodiment, the machine 1400 may also include a network interface 1413 to connect to a wired and/or wireless network for transmitting and/or receiving voice, digital data, and/or media signals. For example, the machine 1400 may communicate with a user device 1480 via the network interface 1413. The user device 1480 may run a user app 1490 for the user to communicate the machine 1400. In one embodiment, the machine 1400 can be controlled remotely via the network interface 1413 by another device, which may be the user device 1480 or a remote control device.

The following description provides further details of the controller's 1410 operations. The controller 1410, by executing the control software 1416, instructs different machine components to operate during a skin spray application session. The controller 1410 instructs the motor module 1450 to move the spray head 1440 along a 3D trajectory to position the spray cartridge 1430 at an appropriate distance and angle to the target area (e.g., a user's face). The distance and angle may be determined based on 3D imaging of the face. The controller 1410 instructs the motor module 1450 to rotate the spray cartridge 1430 about the central axis (which aligns with the z-axis) to aim a selected nozzle at the face. A sequence of spray head movements and spray disk rotations may be determined based on a pre-selected makeup template (i.e., makeup pattern). For example, a pre-selected makeup template of a gala style may include foundation, highlight, eyeshadow of two colors, and blush. Accordingly, the controller 1410 determines an order of activation (nozzles A-B-C-D-E in that order) and the flow volume of each liquid tank. The controller 1410 instructs the motor module 1450 to move the spray head 1440 in front of the target areas of the face according to the 3D facial image, and to rotate the spray cartridge 1430 by pre-determined angles. For example, when a foundation is selected, the spray cartridge 1430 is rotated such that the selected partition containing the foundation faces the user and the corresponding nozzle aims at target areas of the user's face. The air compressor 1420 injects compressed air into the air inlet of the selected partition to spray the foundation to the user's face.

Figure 15:
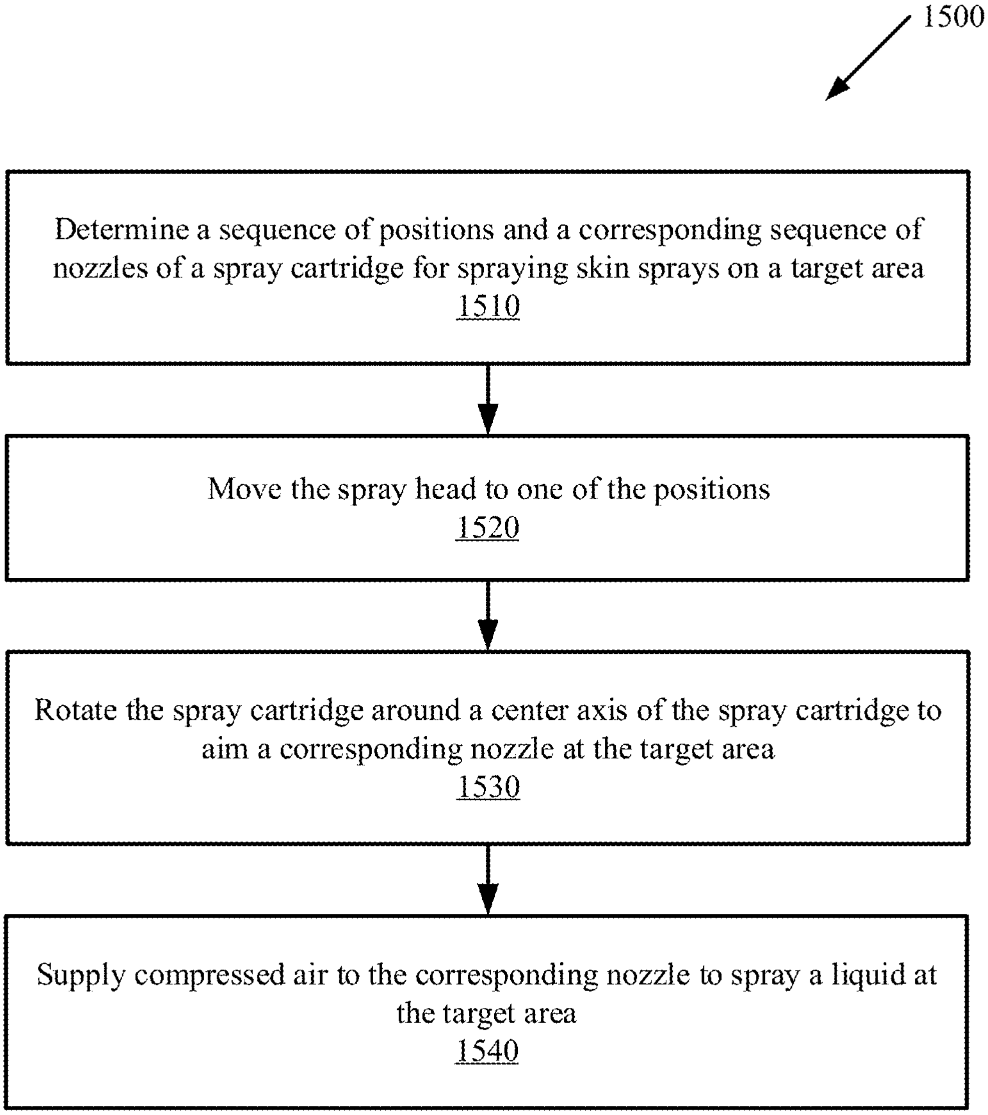
FIG. 15 is a flow diagram illustrating a method for controlling operations of an automatic makeup according to one embodiment.

FIG. 15 is a flow diagram illustrating a method 1500 for controlling operations of an automatic makeup according to one embodiment. Method 1500 may be performed by an automatic makeup machine to spray skin spray liquids contained in a multi-nozzle spray disk at a user. Referring also to FIGS. 1, 2, 13A, 13B, and 14, the steps of method 1500 may be performed by components of the machine 100, 1300, or 1400 under the control of the controller 1410.

Method 1500 starts at the beginning of an application session. At step 1510, the machine determines a sequence of positions and a corresponding sequence of nozzles of a spray cartridge for spraying skin sprays on a target area. At step 1520, the machine moves the spray head to one of the positions. The machine controls the movements of the rotating platform and the moving means (e.g., the y-slider arm 202, the z-slider arm 203, the swing arm 1310, and/or the other aforementioned movements) according to the sequence of positions. At step 1530, the machine rotates the spray cartridge around a center axis of the spray cartridge to aim a corresponding nozzle at the target area. At step 1540, the machine supplies compressed air to the corresponding nozzle to spray a liquid at the target area.

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A makeup machine, comprising:

a housing;

a rotating platform operative to rotate in the housing around a vertical center axis;

a spray head coupled to the rotating platform and operative to: receive a spray cartridge and cause the spray cartridge to spray a material contained therein on a target area of a user's skin;

a chin rest having a top end hinged to a front side of the housing and a bottom end to be pulled out from the front side and swung upwards to a locked position above a top ledge of the housing to thereby provide support for a user's chin;

a z-slider arm having a top-end attached to the spray head to enable vertical movements of the spray head;

a y-slider arm including a horizontal track along which the z-slider arm slides;

an x-slider track along which the y-slider arm slides, wherein x-slider track lies on the rotating platform and is perpendicular to the z-slider arm and the y-slider arm; and a controller circuit within the housing to control movements of the rotating platform, the y-slider arm, and the z-slider arm, wherein the z-slider arm is operative to close the housing by lowering the spray head vertically into the housing such that a top surface of the spray head forms part of a top surface of the housing, and wherein the z-slider arm is operative to open the housing by raising the spray head vertically from inside the housing to a position above the top surface of the housing.

2. The makeup machine of claim 1, wherein in a closed position, the x-slider track, the y-slider arm, and the z-slider arm are positioned inside the housing and the top surface of the spray head is flush with a top ledge of the housing.

3. The makeup machine of claim 1, wherein in a fully open position, the y-slider arm is extendable longitudinally to move the spray head beyond an outer perimeter of the housing.

4. The makeup machine of claim 1, wherein in a fully open position, the z-slider arm is extendable longitudinally to move the spray head above the top ledge of the housing.

5. The makeup machine of claim 1, wherein the rotating platform has a cylindrical shape having a circular top surface.

6. The makeup machine of claim 1, wherein the spray head is operative to rotate around a base at which the spray head connects to the z-slider arm.

7. The makeup machine of claim 1, further comprising:

a viewing element attached to the housing, wherein the viewing element is operative to display a digital image or a reflection of a user of the makeup machine.

8. The makeup machine of claim 1, further comprising:

a viewing element attached to the housing by an attaching means, wherein the attaching means is operative to fold down the viewing element for stowage and to deploy the viewing element in a plurality of positions between a back side of the housing and a front side of the housing.

9. The makeup machine of claim 1, wherein the chin rest includes a sensor embedded on a top end for supporting a user's chin, the sensor operative to detect whether or not the user's chin is on the chin rest.

10. The makeup machine of claim 1, further comprising:

an imaging system to capture a 3-dimensional (3D) profile of the target area; and the controller circuit executing controller software to determine a sequence of positions for the spray head according to the 3D profile, and to control the movements of the rotating platform and the moving means according to the sequence of positions.

11. A makeup machine, comprising:

a housing;

a rotating platform operative to rotate in the housing around a vertical center axis;

a spray head coupled to the rotating platform and operative to: receive a spray cartridge and cause the spray cartridge to spray a material contained therein on a target area of a user's skin;

a chin rest extending longitudinally along a front side of the housing and detachable from the housing, the chin support having a top end for supporting a user's chin and a bottom end flush with a bottom surface of the housing;

a pair of arched arms having audio electronics and wiring embedded therein, wherein the arched arms are attached to the chin rest and wrap around the housing when not in use, and wherein tips of the arched arms are adapted to be swung upward toward a user to press against the user's head or ears to provide audio signals to the user;

a z-slider arm having a top-end attached to the spray head to enable vertical movements of the spray head;

a y-slider arm including a horizontal track along which the z-slider arm slides;

an x-slider track along which the y-slider arm slides, wherein x-slider track lies on the rotating platform and is perpendicular to the z-slider arm and the y-slider arm; and a controller circuit within the housing to control movements of the rotating platform, the y-slider arm, and the z-slider arm, wherein the z-slider arm is operative to close the housing by lowering the spray head vertically into the housing such that a top surface of the spray head forms part of a top surface of the housing, and wherein the z-slider arm is operative to open the housing by raising the spray head vertically from inside the housing to a position above the top surface of the housing.

12. The makeup machine of claim 11, wherein in a closed position, the x-slider track, the y-slider arm, and the z-slider arm are positioned inside the housing and the top surface of the spray head is flush with a top ledge of the housing.

13. The makeup machine of claim 11, wherein in a fully open position, the y-slider arm is extendable longitudinally to move the spray head beyond an outer perimeter of the housing.

14. The makeup machine of claim 11, wherein in a fully open position, the z-slider arm is extendable longitudinally to move the spray head above a top ledge of the housing.

15. The makeup machine of claim 11, wherein the rotating platform has a cylindrical shape having a circular top surface.

16. The makeup machine of claim 11, wherein the spray head is operative to rotate around a base at which the spray head connects to the z-slider arm.

17. The makeup machine of claim 11, further comprising:
a viewing element attached to the housing, wherein the viewing element is operative to display a digital image or a reflection of a user of the makeup machine.

18. The makeup machine of claim 11, further comprising:
a viewing element attached to the housing by an attaching means, wherein the attaching means is operative to fold down the viewing element for stowage and to deploy the viewing element in a plurality of positions between a back side of the housing and a front side of the housing.

19. The makeup machine of claim 11, wherein the chin rest includes a sensor embedded on a top end for supporting a user's chin, the sensor operative to detect whether or not the user's chin is on the chin rest.

20. The makeup machine of claim 11, further comprising:
an imaging system to capture a 3-dimensional (3D) profile of the target area; and
the controller circuit executing controller software to determine a sequence of positions for the spray head according to the 3D profile, and to control the movements of the rotating platform and the moving means according to the sequence of positions.

* * * * *